United States Patent [19]

Frost

[11] Patent Number: 5,113,985
[45] Date of Patent: May 19, 1992

[54] SYNCHRONIZER STRUT GUIDE

[75] Inventor: Barry L. Frost, DeWitt, N.Y.

[73] Assignee: New Venture Gear, Inc., Troy, Mich.

[21] Appl. No.: 607,802

[22] Filed: Nov. 1, 1990

[51] Int. Cl.⁵ .............................................. F16D 23/06
[52] U.S. Cl. ...................................... 192/53 F; 74/339
[58] Field of Search .............. 192/53 F, 53 E; 74/339

[56] References Cited

U.S. PATENT DOCUMENTS

| 3,197,000 | 7/1965 | Conkle | 192/53 F |
| 3,548,983 | 12/1970 | Hiraiwa | 192/53 F |
| 4,445,602 | 5/1984 | Chana | 192/53 F |
| 4,566,568 | 1/1986 | Yant | 74/339 X |
| 4,584,892 | 4/1986 | Hiraiwa et al. | 192/53 E |

FOREIGN PATENT DOCUMENTS 52118 8/1943 France .............................. 192/53 E Primary Examiner—Rodney H. Bonck
Attorney, Agent, or Firm—Harness, Dickey & Pierce

[57] ABSTRACT

The present invention, in its disclosed embodiment, is a strut-type synchronizer including a hub having a tapered guide slot adapted to coact with the tapered side wall surfaces of the struts for retaining the struts therein upon axial movement of the shift sleeve. In a preferred form, the tapered profile of the guide slot includes two inwardly tapered, longitudinally extending side walls terminating in an opening of a predetermined width. The opening is sized to limit the radially outwardly directed movement of the struts when the shift sleeve is shifted axially for inhibiting dislodgement and jamming of the struts.

27 Claims, 5 Drawing Sheets

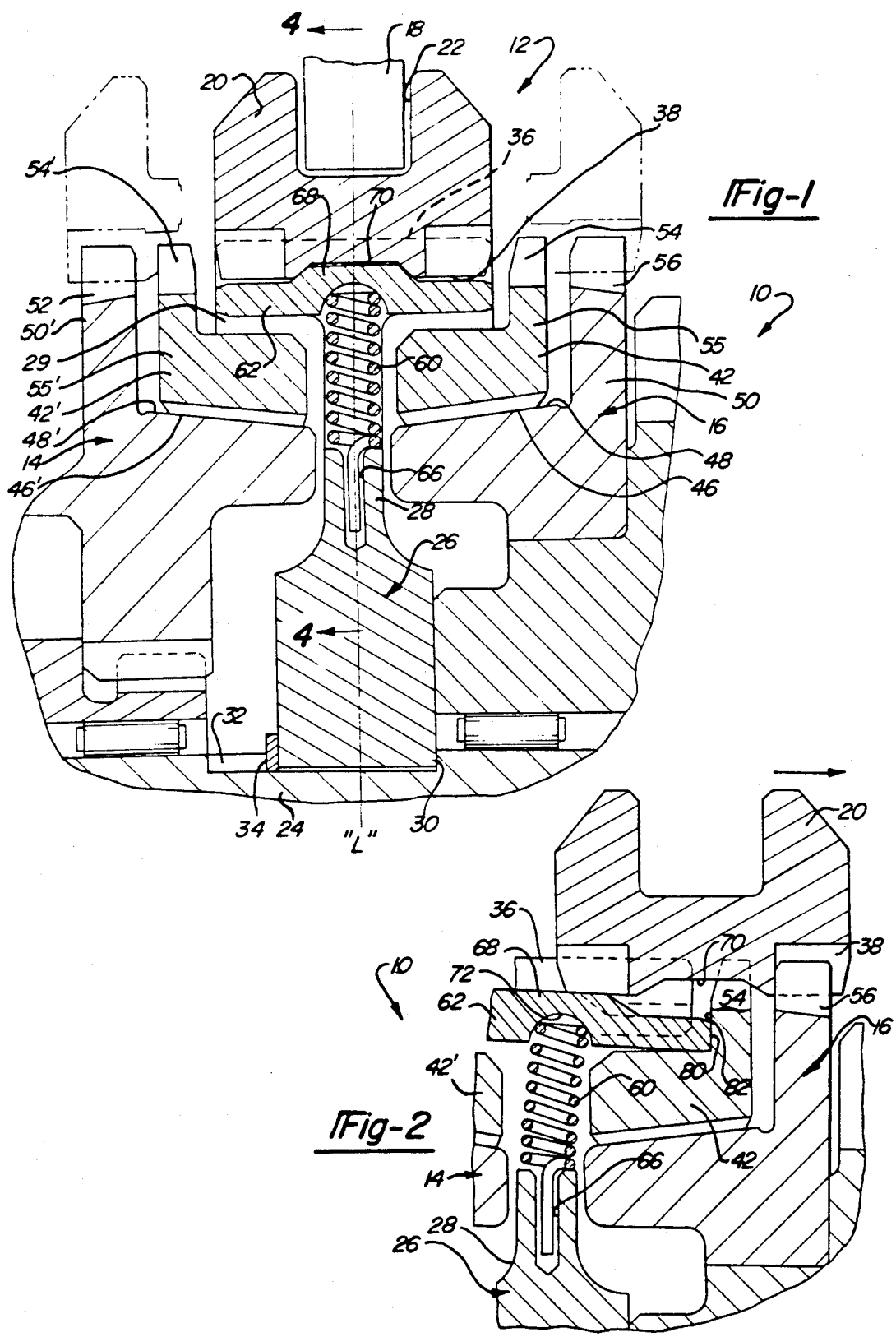

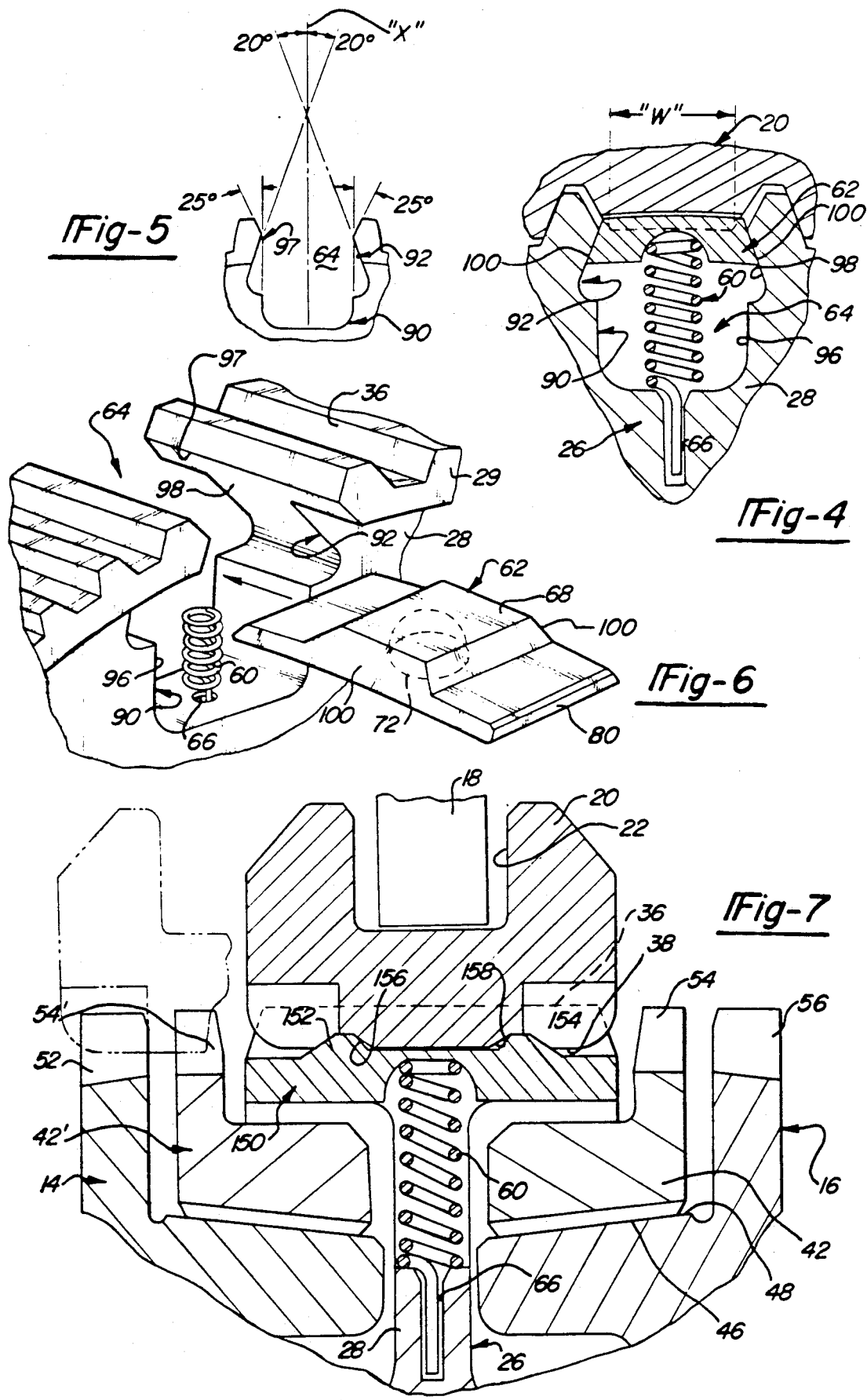

000
SYNCHRONIZER STRUT GUIDE

BACKGROUND OF THE INVENTION

The present invention relates to gear synchronizer mechanisms for manual transmissions, and, more particularly, strut-type synchronizers adapted to prevent dislodgement of the strut members under centrifugal forces.

In general, conventional strut-type synchronizers include a plurality of key-like strut members which are normally biased into engagement with a circumferential detent groove formed in the internal spline surface of the clutch sleeve. Axial displacement of the shift sleeve causes the strut members to energize the synchronizer mechanism for blocking further axial displacement of the clutch sleeve until speed synchronization is complete. For example, U.S. Pat. No. 4,566,568 issued Jan. 28, 1986 to Yant discloses a strut-type synchronizer having a leaf spring member radially interposed between the hub and the clutch sleeve which is adapted to bias the strut members radially outwardly into engagement with the detent groove formed in the inner bore of the clutch sleeve.

U.S. Pat. No. 4,770,280 issued Sept. 13, 1988 to Frost and assigned to the common assignee of the instant application, discloses a strut-type blocking synchronizer mechanism which is incorporated into a vehicle transfer case for shifting from a two-wheel drive mode to a four-wheel drive mode of operation. The synchronizer mechanism includes a pair of energizing retainer springs acting to radially outwardly bias the strut members confined within slots in the hub into engagement with the detent groove.

The principle drawback associated with most conventional strut-type synchronizers however, has been their susceptiblity to becoming dislodged by centrifugal forces acting thereupon. It will be appreciated by those skilled in the art that conventional strut-type synchronizers are typically wider than "strutless" synchronizers since the clutch sleeve must support and retain the strut members within the hub upon full axial travel of the clutch sleeve into lock-up engagement with a speed gear or sprocket. However, it is desirable in most modern manual transmission and transfer cases to minimize the overall width of the synchronizer.

SUMMARY OF THE INVENTION

It is therefore an object of the present invention to overcome the disadvantages associated with the prior art by providing an improved blocking synchronizer mechanism which prevents the dislodgement of strut members under centrifugal and spring forces, and which also ensures that the strut members are less susceptible to becoming jammed or cocked during operation.

It is a further object of this invention to provide a relatively thin strut-type synchronizer mechanism adapted for use with larger friction cones to generate greater torque capacity within the transmission.

Another object of the present invention is to provide an improved strut-type synchronizer mechanism which is designed to permit axial movement of the strut members while limiting radial movement thereof to prevent the strut members from escaping from the hub by the effects of centrifugal and spring biasing forces.

The present invention, in its disclosed embodiments, is a strut-type synchronizer including a hub member having a plurality of axially extending guide slots formed in its outer circumference which are adapted to confine a similar plurality of strut members therein. The guide slots and strut members are configured to have complimentary tapered wall surfaces adapted to allow axial movement of the strut members while inhibiting excessive outward radial movement thereof so as to prevent the strut members from becoming dislodged from the hub guide slots upon centrifugal action.

These and other objects and advantages of the present invention will become more apparent to those skilled in the art from the following description and drawings.

BRIEF DESCRIPTION OF THE DRAWINGS

FIG. 1 is an enlarged fragmentary cross-sectional view of a portion of an exemplary motor vehicle transmission having a strut-type synchronizer mechanism according to a first embodiment of the present invention;

FIG. 2 is an enlarged cross-sectional view, similar to FIG. 1, showing the operative association of the various components in a "locked-up" position;

FIG. 4 is a cross-sectional view taken along lines 4—4 of FIG. 1;

FIG. 5 is a view similar to FIG. 4, with the strut member and spring removed to illustrate the profile of the guide slot;

FIG. 6 is an enlarged perspective view of the strut member and guide slot portion of the hub used with the first embodiment of the present invention;

FIG. 7 is an enlarged fragmentary cross-sectional view of a portion of a strut-type synchronizer mechanism according to a second embodiment of the present invention;

DETAILED DESCRIPTION OF THE INVENTION

Figure 3:
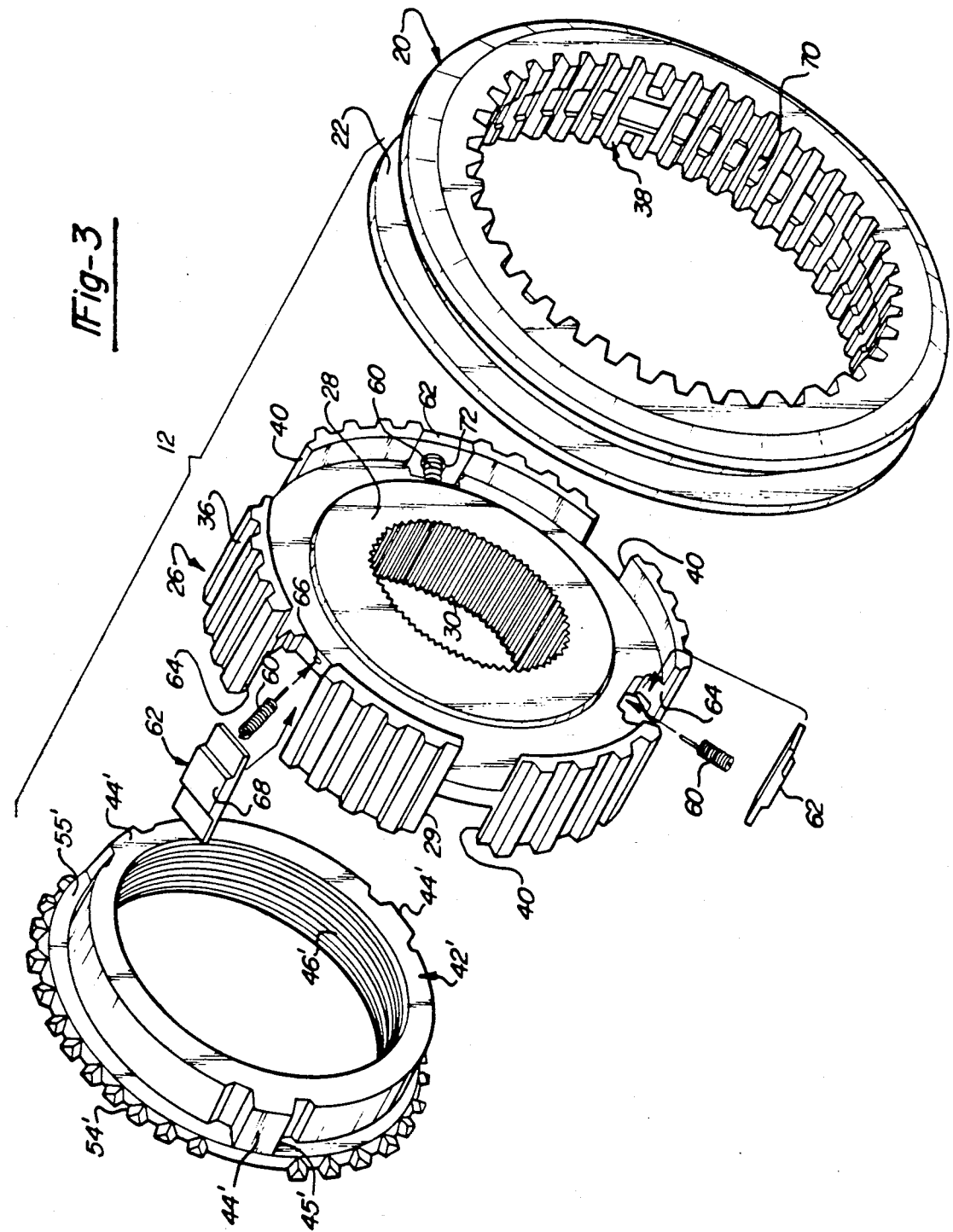
FIG. 3 is an exploded perspective view of the left hand components of the strut-type synchronizer mechanism of FIG. 1.

With particular reference to FIGS. 1 through 3, a portion of a multi-speed motor vehicle manual transmission is shown generally at 10. Reference may be had to U.S. Pat. No. 4,677,868 issued July 7, 1987, to T. J. Filkins, and assigned to the assignee of the present application for a more detailed description of an exemplary manual transmission suitable for use with the present invention, the disclosure of which is incorporated herein by reference.

Manual transmission 10 includes a synchronizer clutch unit 12 which is shown as a bi-directional single cone clutch mechanism. Synchronizer unit 12 is shown interposed between left and right transmission gears 14 and 16, respectively. As is known in the art, clutch unit 12 is actuated by means of a shift fork, partially indicated at 18, which is supported on a gear box shift selector rail (not shown). Thus, shift fork 18 is longitudinally slidable with its selector rail to shift clutch sleeve 20 by means of a circumferential external groove 22. In the disclosed embodiment, synchronizer clutch unit 12 is commonly referred to as a "strut-type" synchronizer unit. It is to be understood that while "strut-type" synchronizer 12 of the present invention is shown incorporated in a bi-directional single-cone synchronizer arrangement, it could otherwise be incorporated into a unidirectional and/or multiple-cone synchronizer clutch unit without departing from the fair scope of the present invention. Thus, for example, the principles of the present invention can be used in a unidirectional synchronizer clutch for use with the transmission reverse gear drive. It is likewise to be understood that the present invention is readily adaptable for use with most transfer case synchronizer applications as well as the manual transmission illustrated herein.

Synchronizer unit 12 is depicted intermediate left and right transmission gears 14 and 16, respectively, both of which are generally supported on a shaft 24. Synchronizer unit 12 includes a hub 26 fixed to shaft 24 through hub internal splines 30 engaging shaft external splines 32. A snap ring 34 is provided to axially position and maintain hub 26 on shaft 24. Hub 26 includes a web portion 28 and longitudinally extending circumferential portion 29 having an externally splined surface 36 formed thereon. Shift sleeve 20 is mounted for rotation with hub 26 by means of hub external splined surface 36 slidably engaging sleeve internal splined surface 38. Thus, shift sleeve 20 is axially movable in a fore or aft direction relative to hub 26 by means of shift fork 18. It will be noted in FIG. 3 that hub external splined surface 36 is formed with three equally spaced notches 40 extending radially inwardly toward web 28 for reasons to be explained below.

Synchronizer clutch unit 12 is shown as a single-cone "strut-type" synchronizer having a single cone surface and a single mating friction surface for each of its associated left and right speed gears 14 and 16, respectively. Since bidirectional synchronizer unit 12 is symmetrical by a center transverse plane of construction line "L" in FIG. 1, like numbers will be used to describe right and left hand parts, the left hand parts being primed. Thus, the operation of only the right hand side of the clutch assembly, as shown in FIG. 2, will be described hereinafter in greater detail.

Synchronizer clutch unit 12 includes a pair of fore and aft (i.e., left and right) blocker rings 42' and 42, respectively. FIG. 3 illustrates left-hand blocker ring 42' being provided with three raised lugs 44' equally spaced at 120° intervals therearound. Each lug 44' is adapted to nest within its associated hub notch 40. Thus, during indexing or "clocking" of blocking ring 42', lugs 44' have their respective side faces 46' in contact with an edge of notch 40.

Blocking rings 42' and 42 are shown to include an internal friction surface 46' and 46, respectively, adapted to contact a first external cone surface 48' and 48, respectively, formed on left and right gears 14 and 16, respectively. It will be noted that in the disclosed embodiments, friction surfaces 46' and 46 are in the form of a friction pad or lining bonded or cemented to its associated conical surface for providing effective frictional engagement. An example of one type of suitable friction lining that may be used with the present invention is disclosed in U.S. Pat. No. 4,267,912 issued May 29, 1981 to Bauer, et al. The disclosure of which is expressly incorporated by reference herein.

Radial flange portion 50' of left speed gear 14 has a spline tooth surface 52 which is coaxial and alignable with a spline tooth surface 54' formed on a raised outer circumferential portion 55' of synchronizer blocking ring 42'. Both spline surfaces 52 and 54' are engageable with shift sleeve internal spline surface 38, the splines of which are in continual meshed engagement with hub external spline surface 36 upon shift sleeve 20 being shifted leftwardly toward gear 14 and into its leftward speed gear mode. In a like manner, right speed gear 16 has a radial flange portion 50 having a spline surface 56 coaxial and alignable with spline surface 54 of blocking ring 42. As shown in FIG. 2, both spline surfaces 56 and 54 are engageable with shift sleeve internal splined surface 38 upon shift sleeve 20 being shifted rightwardly into its rightward speed gear mode. When internal splined surface 38 of shift sleeve 20 is in constant axial sliding engagement with external splined surface 36 formed on hub 26, shift sleeve 20 may be manually shifted to the right or left to complete lock up of left or right speed gears, respectively, such that internal splined surface 38 drivingly engages external spline teeth 52 and 56, respectively.

In strut-type blocking synchronizer 12, a thrust mechanism is shown to include a helical compression spring 60 which is compressed and inserted between a strut member 62 and hub 26. In the particular embodiments shown, three (3) struts 62 are uniformly spaced on 120° centers and are adapted to be radially outwardly biased by springs 60 in their respective longitudinally extending guide slots 64. As will be described hereinafter in greater detail, guide slots 64 are formed in web portion 28 of hub 26 and have longitudinally extending side walls configured to cooperate with facing edge surfaces of strut 62 for retaining strut 62 against dislodgement out of guide slots 64 under all radially outward forces. As will be appreciated, clutch unit 12 is shown to be thinner than most conventional strut-type synchronizers, since clutch sleeve 20 is not required to retain struts 62 in guide slots 64 as in conventional strut-type synchronizers. In addition, the thinner struts permit use of larger cone torque surfaces for generating greater torque capacity within the transmission.

A tail portion of compression spring 60 is disposed within a spring seat bore 66 extending into hub web 28. Strut members 62 each have a raised central stop projection or "hump" portion 68 which engage a corresponding central detent groove 70 circumferentially formed in shift sleeve internal splined surface 38 when shift sleeve 20 and struts 62 are in the "neutral" position of FIG. 1. Struts 62 have a spherical pocket 72 adapted to engageably confine the opposite end of spring 60. As shift sleeve 20 effects axial fore and aft movement of struts 62 during shifting, compression spring 60 "tips" slightly as seen in FIG. 2. Spherical pocket 72 assists in retaining spring 60 in engagement with struts 62 during tipping thereof.

Compression springs 60 are sized to produce a predetermined compressive force for biasing struts 62 in a radially outward direction within guide slots 64 for permitting strut members 62 to move in an axial direction upon axial movement of shift sleeve 20. Heretofore the shift sleeve had to be of a sufficient width to cover a majority of the strut since the compressive force of the thrust member tended to urge the struts out of the non-tapered slots.

With particular reference to FIG. 2, initial rightward axial movement of shift sleeve 20 toward right speed gear 16 causes strut members 62 to correspondingly move axially in the same direction until a longitudinal end face 80 of struts 62 engages a transverse flanged surface 82 of blocker ring 42. In particular, compression springs 60 bias hump 68 of strut members 62 into maintained engagement with detent groove 70 such that both shift sleeve 20 and strut members 62 move out of the central "neutral" position. As is known in the synchronizer art, engagement of struts 62 with end face 82 of blocker ring 42 generates initial frictional cone torque loading between blocker ring friction surface 46 and exterior cone surface 48 of gear 16. As such, blocking ring 42 is "clocked" to an indexed position preventing continued axial displacement of shift sleeve 20 until synchronization is complete. With blocking ring 42 in its indexed position, sleeve 20 moves to a chamfer-to-chamfer loading position between the opposed faces of exterior spline tooth surface 54 on blocker ring 42 and shift sleeve interior splined surface 38.

When the speed of right speed gear 16 relative to blocker ring 42 approaches "zero", the cone torque falls to zero. Synchronization is now complete and blocker ring 42 is no longer energized. Since the index torque resulting from the chamfer-to-chamfer loading between sleeve internal splined surface 38 and blocker ring teeth 54 exceeds the cone torque, blocker ring 42 rotates in an opposite direction and out of its "clocked" position. Thereafter, right speed gear 16 rotates aside to pass sleeve internal splined surface 38 beyond blocker ring teeth 54 until there is locked contact between sleeve splined surface 38 and its associated gear teeth splines 56. The right hand "locked-up" position is shown in FIG. 2. The fully extended fore and aft positions of clutch sleeve 20 are shown in phantom in FIG. 1. As is apparent, relatively short fore and aft axial travel of clutch sleeve 20 is associated with the thinner width design of strut-type synchronizer 12 of the present invention. Moreover, the narrow width of clutch sleeve 20 tends to leave a majority of strut 62 uncovered when shift sleeve 20 is shifted to its maximum axial positions such that clutch sleeve 20 is shifted beyond the centerline of struts 62. As will be appreciated, similar interaction of the components associated with the left hand side of clutch unit 12 occurs during the leftward axial movement of shift sleeve 20 shifting into engagement with left speed gear 14.

FIGS. 1 and 2 illustrate the interaction of struts 62 and shift sleeve 20 in the "neutral" and the rightward "locked-up" positions as shift sleeve 20 is axially moved toward right speed gear 16. Compression springs 60 are further compressed upon struts 62 being displaced from the "neutral" position upon continual axial movement of sleeve 20 following completion of the speed synchronization operation. More particularly, upon continued axial displacement of shift sleeve 20, strut members 62 exit detent groove 70 such that compression springs 60 urge strut members 62 into engagement with a portion of sleeve splined surface 38 adjacent detent groove 70.

With particular reference now to FIGS. 4 through 6, a modified tapered wall profile for guide slots 64 is shown which coacts with strut members 62 to provide a significant improvement in the strut-type synchronizer art. According to the teachings of the present invention, guide slots 64 have first (lower) and second (upper) longitudinally extending chambers 90 and 92, respectively, which are radially formed in hub web 28. Spring seat 68 is bored into lower chamber 90 along a generally central axis thereof. Lower chamber 90 includes upstanding side wall surfaces 96 which are generally parallel and colinear with a central longitudinal axis of guide slot 64. Upper slot chamber 92 communicates with lower chamber 90 and has a generally tear drop configuration for defining back-angled longitudinal wall surfaces 98. Preferably, the back-angled wall surfaces 98 are inwardly tapered to converge at an angle of about 20° relative to the central longitudinal axis of its guide slot 64 and terminate in a longitudinally extending opening 97 through circumferential portion 29 of hub 26. Opening 97 has a predetermined width through which struts 62 are axially and radially moveable. As will be appreciated, the angularity of the tapered wall surfaces 98 can be selected to meet any suitable sliding requirement between struts 62 and guide slots 64. Opening 97 has a width dimension "W" which is smaller than the width of a lower portion of struts 62.

As shown in FIGS. 4 and 6, struts 62 include longitudinally extending edge surfaces 100 which are angularly configured to cooperate with tapered wall surfaces 98 of guide slots 64. As such, struts 62 can be radially compressed inwardly upon axial movement with clutch sleeve 20 without sliding interference from tapered walls 98 in a manner inhibiting "cocking" of struts 62 in guide slots 64. Likewise, compression springs 60 normally bias struts 62 radially outwardly until a movement restricting engagement between wall surfaces 98 and edge surfaces 100 inhibit further outward radial movement of struts 62 through opening 97. In this radial outermost extended position, stop projection 68 of struts 62 engage detent groove 70 of clutch sleeve 20. Therefore, the cooperating tapered surfaces inhibit dislodgement of struts 62 at any axial position of clutch sleeve 20 relative thereto such as the extreme position shown (in phantom) in FIG. 1. As will be appreciated, struts 62 and hub 26 are made from materials which permit axial sliding movement of struts 62 with guide slots 64. The outermost radial edge of tapered wall surfaces 98 of upper chamber 92 terminates at a point below the periphery of hub splined surface 36 to permit normal intermeshed engagement between clutch sleeve splines 38 and struts 62.

The present invention permits strut member 62 to be relatively thin compared to conventional strut members such that larger frictional surfaces (i.e., larger diameter blocker rings) can be used for generation of greater torque capacity. Similarly, the narrow width of synchronizer 12 permits normal axial travel "lock-up" requirements since the clutch sleeve is not required to totally support and retain the struts within their grooves as in prior art strut-type synchronizers. It will thus be appreciated by those skilled in the art that the modified guide slot profile represents a solution to dislodgement under radially directed loading, the latter having been a major deficiency of the prior art. In the present invention, strut 62 will be positively retained within guide slots 64 even under conditions of extreme centrifugal and/or spring generated forces.

Figure 8:
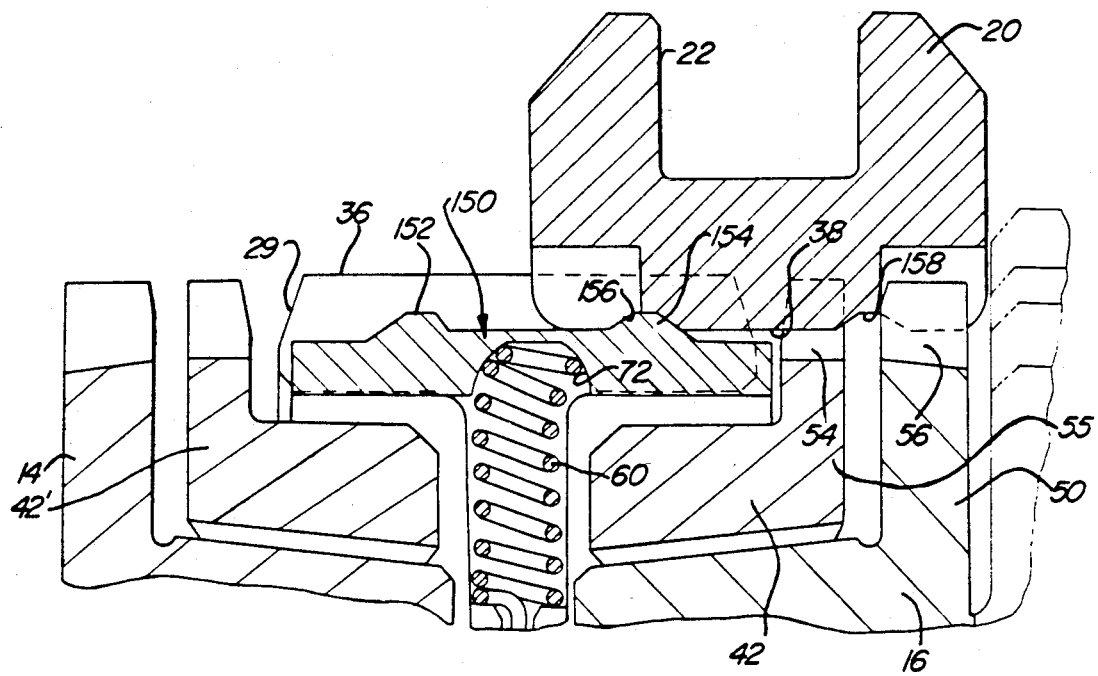
FIG. 8 is an enlarged cross-sectional view, similar to FIG. 7, showing the various components in an operative "lockedup" position.
Figure 10:
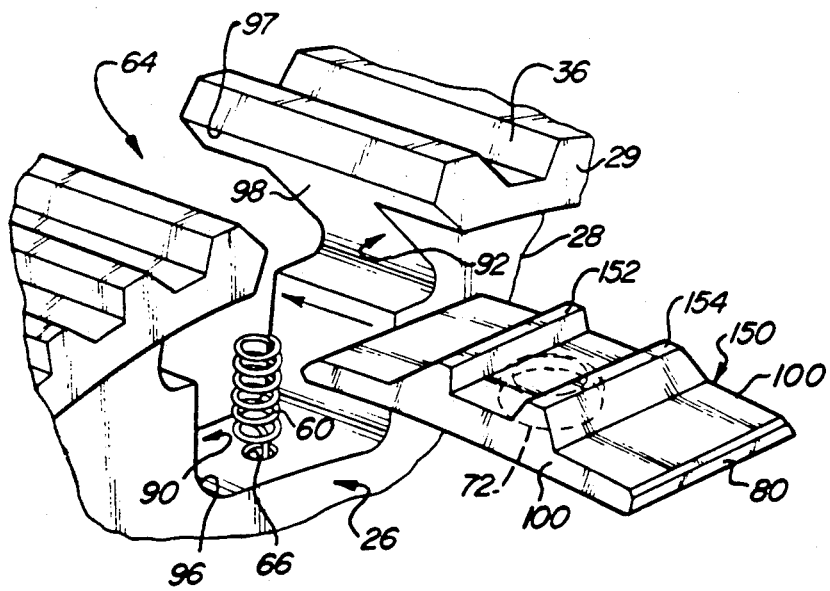
FIG. 10 an enlarged perspective view of the strut member and guide slot portion of the hub associated with the second embodiment.
Figure 9:
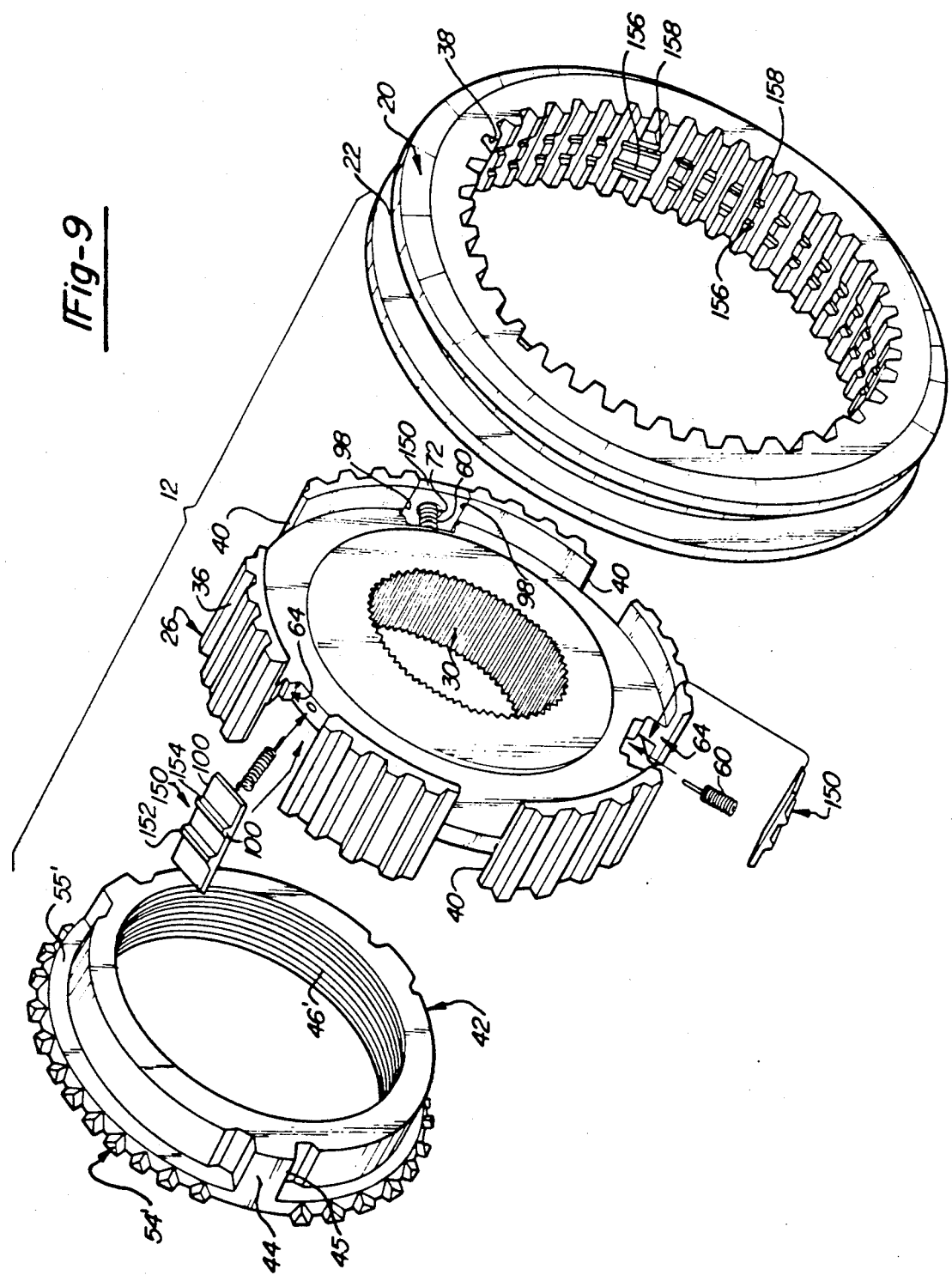
FIG. 9 is an exploded perspective view of the left hand components of the synchronizer shown in FIG. 7.

With particular reference now to FIGS. 7 through 10, a second embodiment of the present invention is illustrated. The second embodiment is substantially similar to that which is described in reference to the first embodiment with the exception that strut members 150 are shown as a "double hump" type having dual stop projections 152 and 154 respectively. Similarly, shift sleeve 20 is modified to include a pair of cooperating circumferentially extending detent grooves 156 and 158. FIG. 7 illustrates the "neutral" position of the synchronizer components. As shown in FIG. 8, when shift sleeve 20 is axially shifted to its maximum rightward "locked-up" position with right gear 16, right hump 154 is lockingly engaged within left detent groove 156. This provides a positive positioning of strut members 150 relative to clutch sleeve 20. Similarly, when shift sleeve 20 is in its leftwardmost locked position with left gear 14, left hump 152 is engaged in right groove 158.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. In a synchronizer clutch and gear assembly comprising a longitudinally extending shaft having an externally splined hub fixed thereon, said hub having an axially extending guide slot formed in the outer circumference thereof, a first gear journally mounted on said shaft adjacent one axial side of said hub and having an externally splined surface, a shift sleeve having an internally splined surface slidably coupled to said hub external splined surface and being axially slidable thereon in a first direction from a neutral position to a first operative position such that upon said shift sleeve internal splined surface being moved into engagement with said first gear external splines said clutch is operative to couple said first gear in rotation with said shaft, a blocker ring having first friction surface means and defining a clearance with cooperating second friction surface means associated with said first gear, a strut positioned for axial and radial movement within said guide slot, spring means for urging said strut into engagement with said internally splined surface of said shaft sleeve such that said strut moves into engagement with said blocker ring during the axial shifting operation of said shift sleeve toward said first gear to effect frictional engagement of said first and second friction surface means, an improvement wherein said guide slot has tapered inner wall surface means adapted to be slidably engageable with complementary tapered outer surface means formed on said strut for permitting axial and radially inward movement of said start within said guide slot while inhibiting excessive radially outward movement therein for retaining said strut within said guide slot under radially outwardly generated forces and said shaft sleeve has a width dimension which uncovers greater than one-half of said strut when said shift sleeve is moved to said first operative position whereby said cooperative inner and outer tapered wall surface means inhibit said strut from becoming dislodged from said guide slot.

2. The synchronizer clutch and gear assembly of claim 1 wherein said radially outwardly generated forces comprises centrifugal forces associated with rotation of said hub and spring forces generated by said spring means both of which act on said strut.

3. The synchronizer clutch and gear assembly of claim 1 wherein said inner tapered wall surface means comprises a first pair of opposed inwardly tapered longitudinally extending side walls of said guide slot, said first pair of tapered walls converging inwardly toward a central longitudinal axis of said guide slot to define a longitudinal opening, said outer wall surface means including a second pair of opposed longitudinal side walls formed on said strut which are tapered for complimentary sliding and mating engagement with said first pair of tapered walls of said guide slot to permit a predetermined range of outward radial movements of said strut through said opening.

4. The synchronizer clutch and gear assembly of claim 1 wherein said spring means is a helical compression spring member disposed within said guide slot below said strut and wherein said strut includes a rounded seat surface provided for engaging an end of said spring member to inhibit dislodgement of said spring from said strut upon axial movement of said strut.

5. The synchronizer clutch and gear assembly of claim 1 further comprising:
a second gear journally mounted on said shaft adjacent the other axial side of said hub and having an externally splined tooth surface;
said shift sleeve being axially movable in a second direction from said neutral position to a second operative position such that upon said internal splined surface of said shift sleeve being moved into meshing engagement with said splines of said second gear, said clutch is operative to couple said second gear in rotation with said shaft; and
a second blocker ring having third friction surface means defining a clearance with cooperating fourth friction surface means associated with said second gear, whereby said synchronizer clutch and gear assembly is a bi-directional assembly.

6. The synchronizer clutch and gear assembly of claim 5 wherein said assembly is a single-cone bi-directional assembly having a plurality of at least three equally spaced struts.

7. A double-acting synchronizer clutch and gear assembly comprising:
a shaft with said clutch assembly located intermediate first and second gear journally mounted on said shaft, each of said gears having an externally splined tooth surface concentrically formed thereon;
a clutch hub fixed on said shaft intermediate said gears and having an externally splined tooth surface;
a shaft sleeve having an internally splined tooth surface intermeshed with said hub externally splined tooth surface and adapted for slidable axial travel relative to said hub in a first and second direction for selectively engaging said first and second gear splined tooth surfaces, respectively, so as to alternately couple said first and second gears for rotation with said shaft;
a first blocker ring concentrically surrounding said shaft intermediate said first gear and said clutch hub, said first blocker ring having a first conical friction surface defining a clearance with a cooperating second friction surface means adapted for rotational movement with said shaft;
a second blocker ring concentrically surrounding said shaft intermediate said second gear and said clutch hug, said second blocker ring having a third conical friction surface defining a clearance with cooperating fourth friction surface means adapted for rotation with said shaft;
strut means confined within axially extending guide slots formed in the outer periphery of said clutch hub for moving one of said first and second blocker rings toward its associated gear during axial shifting operation of said shift sleeve so as to effect frictional engagement of said one blocker ring's associated conical friction surface with its associated gear conical friction surface means for generating cone torque therebetween;

said guide slots and strut means each having complementary tapered side wall surfaces adapted to limit radial outward movement of said strut means for preventing dislodgement of said strut means from said guide slots due to radially outwardly generated forces while permitting normal axial and radially inward movement of said strut means therein;

spring means for biasing said strut means radially outwardly and into contact with said internally splined tooth surface of said shaft sleeve; and said shaft sleeve has a width dimension sized to uncover greater than one-half of the axial length of said strut means when said shift sleeve is moved in said first and second directions whereby said complementary tapered side wall surfaces inhibit said strut from becoming radially outwardly dislodged from said guide slot.

8. The double-acting synchronizer assembly of claim 7 wherein said radially outwardly generated forces comprise centrifugal and spring forces acting on said strut means.

9. The double-acting synchronizer assembly of claim 7 wherein said guide slot has a pair of opposed back-angled longitudinally extending side walls which define a longitudinal opening, said strut means having complimentary facing longitudinal side walls which are tapered to slidingly matingly engage said back-angled side walls of said guide slot to permit a predetermined range of outward radial movement of said strut means through said opening.

10. The double-acting synchronizer assembly of claim 9 wherein said strut means is disposed for axial movement in said longitudinally extending guide slot such that said strut means is adapted to engage a transverse end surface of said blocker rings for selectively moving each of said blocker rings toward its associated gear, and wherein said spring means is a helical compression spring disposed within said guide slot intermediate said hub and said strut means.

11. The synchronizer clutch and gear assembly of claim 10 wherein said assembly is a single-cone bi-directional assembly having a plurality of at least three equally spaced strut means.

12. In a double-acting gear synchronizer clutch assembly comprising:

fore and aft gears journally mounted on a shaft, each of said gears having an externally splined surface formed thereon;

an externally splined hub fixed on said shaft intermediate said gears, said hub having a plurality of longitudinally extending guide slots formed in the outer circumference thereof;

fore and aft blocker rings surrounding said shaft on opposite sides of said hub and each having a first conical friction surface defining a clearance with a cooperating second conical friction surface associated with said gears;

a shift sleeve encircling said hub and having internal spline teeth in continual meshing engagement with said hub external spline teeth, said shift sleeve being axially moveable in either a fore or aft direction such that said shift sleeve internal spline teeth are adapted to selectively engage said fore or aft gear externally splined surfaces;

a plurality of strut members confined for radial and axial movement within said longitudinally extending guide slots; and spring means for urging said struts into engagement with said shift sleeve internal spline teeth, said struts adapted to engage one of said blocker rings during the axial shifting operation of said shift sleeve to effect frictional engagement of its associated first and second conical friction surfaces for developing cone torque therebetween for rotating said blocker ring in one direction to an indexed position;

whereby when the index torque developed in said indexed position exceeds the cone torque said blocker ring is rotated in the opposite direction for allowing said shift sleeve internal splines to pass into lock-up meshed engagement with associated gear external splined surface to permit said shift sleeve to thereafter complete its full axial travel, the improvement wherein:

said guide slots and strut members each having complementary tapered side wall surfaces adapted to limit radial outward movement of said strut members to prevent dislodgement of said strut members from said guide slots while permitting normal axial and radially inward movement of said strut members therein; and said shift sleeve has a width dimension sized to uncover greater than one-half of said strut members when said shift sleeve is moved in said fore and aft directions whereby said complementary tapered side wall surfaces inhibit said strut members from becoming radially outwardly dislodged from said guide slot.

13. The double-acting synchronizer assembly of claim 12 wherein each of said guide slots has a pair of back-angled side walls which converge toward a central longitudinal axis of said guide slot to define a longitudinal opening, said strut members having a second pair of complimentary tapered side walls which slidingly and matingly engage said back-angled side walls of said guide slots to permit a predetermined range of outward radial movements of said struts through said opening.

14. The synchronizer clutch and gear assembly of claim 12 wherein said spring means is a helical compression spring member disposed within said guide slot below said strut and wherein said strut includes a rounded seat surface provided for engaging an end of said spring member to inhibit dislodgement of said spring from said strut upon axial fore and aft movement of said strut.

15. The synchronizer clutch and gear assembly of claim 14 wherein said assembly is a single-cone bi-directional assembly having a plurality of at least three equally spaced struts.

16. A strut-type transmission synchronizer comprising:

a hub member rotatable supported on a shaft of a motor vehicle transmission apparatus and having an externally splined surface, said hub having an axially extending guide slot on the outer circumference thereof, said guide slot having first tapered wall means terminating in a longitudinally extending opening;

a shift sleeve having an internal splined tooth surface non-rotatably mounted over and in sliding engagement with said hub external splines;

a blocker ring disposed axially with respect to said hub;

a strut positioned within said guide slot and adapted for radial and axial movement therein, said strut having complementary second tapered wall means adapted to slidingly engage said first tapered wall means and sized to permit limited outward radial movement of said strut relative to said guide slot for retaining said strut therein under radially outward directed forces;

spring means for biasing said strut into engagement with a neutral detent groove circumferentially formed in said shift sleeve internal splined tooth surface for axial movement with said shift sleeve until said strut engages said blocking ring;

said shift sleeve has a width dimension which uncovers greater than one-half of said strut when said shift sleeve is moved to a first operative position whereby said cooperative first and second tapered wall surface means inhibit said strut from becoming dislodged from said guide slot.

17. The strut-type transmission synchronizer of claim 16 further comprising a second blocker ring disposed adjacent the opposite axial side of said hub for defining a bi-directional transmission synchronizer.

18. The strut-type transmission synchronizer of claim 17 wherein said assembly is a single-cone bi-directional assembly having a plurality of at least three equally spaced struts.

19. The strut-type transmission synchronizer of claim 17 wherein said radially outwardly generated forces comprise centrifugal and spring forces acting on said strut means.

20. The strut-type transmission synchronizer of claim 19 wherein said first tapered wall means is a pair of back-angled side walls of said guide slot which converge toward a central axis of said guide slot, and said second tapered wall means comprising a pair of complimentary back-angled outer side walls of said strut.

21. A synchronizer clutch and gear assembly comprising:
a longitudinally extending shaft having an externally splined hub fixed thereon, said hub having an axially extending guide slot formed in the outer circumference thereof;
a first gear journally mounted on said shaft adjacent one axial side of said hub and having an externally splined surface;
a shift sleeve having an internally splined surface slidably coupled to said hub and having an externally splined surface;
a shift sleeve having an internally splined surface slidably coupled to said hub external splined surface and being axially slidable thereon in a first direction from a neutral position to a first operative position such that upon said shift sleeve internal splined surface being moved into engagement with said first gear external splines said clutch is operative to couple said first gear in rotation with said shaft;
a blocker ring having first friction surface means and defining a clearance with cooperating second friction surface means associated with said first gear;
a strut positioned for axial and radial movement within said guide slot, said strut having tapered outer surface means and a rounded seat surface;
spring means for urging said strut into engagement with said internally splined surface of said shift such that said strut moves into engagement with said blocker ring during axial shifting of said shift sleeve toward said first gear to effect frictional engagement of said first and second friction surface means, said spring means being located within said guide slot and having a first end in engagement with said rounded seat surface of said strut for inhibiting dislodgement of said spring means for said strut upon axial shifting of said shift sleeve toward said first gear; and said guide slot having tapered inner wall surface means adapted to be slidably engageable with said complementary tapered outer surface means formed on said strut for permitting axial and radially inward movement of said strut within said guide slot while inhibiting excessive radially outward movement therein for retaining said strut within said guide slot under radially outwardly generated forces.

22. The synchronizer clutch and gear assembly of claim 21 wherein said radially outwardly generated forces comprise centrifugal forces associated with rotation of said hub and spring forces generated by said spring means both of which act on said strut.

23. The synchronizer clutch and gear assembly of claim 21 wherein said shift sleeve has a width dimension which uncovers greater than one-half of said strut when said shift sleeve is moved to said first operative position whereby said cooperative inner and outer tapered wall surface means inhibit said strut from becoming cocked within said guide slot or dislodged from said guide slot.

24. The synchronizer clutch and gear assembly of claim 21 wherein said inner tapered wall surface means comprises a first pair of opposed inwardly tapered longitudinally extending side walls of said guide slot, said first pair of tapered walls converging inwardly toward a central longitudinal axis of said guide slot to define a longitudinal opening, said outer wall surface means including a second pair of opposed longitudinal side walls formed on said strut which are tapered for complementary sliding and mating engagement with said first pair of tapered walls of said guide slot to permit a predetermined range of outward radial movements of said strut through said opening.

25. A strut-type transmission synchronizer comprising:
a hub member rotatable supported on a shaft of a motor vehicle transmission apparatus and having an externally splined surface, said hub having an axially extending guide slot on the outer circumference thereof, said guide slot having first tapered wall means terminating in a longitudinally extending opening;
a shift sleeve having an internal splined tooth surface non-rotatably mounted over and in sliding engagement with said hub external splines;
a blocker ring disposed axially with respect to said hub;
a strut positioned with said guide slot and adapted for radial and axial movement therein, said strut having a rounded seat surface and complementary second tapered wall means adapted to slidingly engage said first tapered wall means and sized to permit limited outward radial movement of said strut relative to said guide slot for retaining and strut therein under radially outward directed forces; and spring means for biasing said strut into engagement with a neutral detent groove circumferentially formed in said shift sleeve internal splined tooth surface for axial movement with said shift sleeve until said strut engages said blocking ring, said spring means adapted to engage said rounded seat surface of said strut such that said rounded seat surface acts to inhibit dislodgement of said spring means from said strut during axial movement of said shift sleeve.

26. The strut-type transmission synchronizer of claim 25 wherein said first tapered means is a pair of backangled side walls of said guide slot with converge toward a central axis of said guide slot. and said second tapered wall means comprising a pair of complementary backangled outer side walls of said strut.

27. The synchronizer clutch and gear assembly of claim 25 wherein said shift sleeve has a width dimension which uncovers greater than one-half of said strut when said shift sleeve is moved to said first operative position whereby said cooperative inner and outer tapered wall surface means inhibit said strut from becoming locked within said guide slot or dislodged from said guide slot.

* * * * *

UNITED STATES PATENT AND TRADEMARK OFFICE
CERTIFICATE OF CORRECTION

PATENT NO. : 5,113,985
DATED : May 19, 1992
INVENTOR(S) : Barry L. Frost

It is certified that error appears in the above-indentified patent and that said Letters Patent is hereby corrected as shown below:

```
Col.  2, line 42, ""lockedup"" should be --"locked-up"--
Col.  7, line 38, claim 1, "shaft" should be --shift--
Col.  7, line 46, claim 1, "start" should be --strut--
Col.  7, line 50, claim 1, "start" should be --shift--
Col.  8, line 37, claim 7, "gear" should be --gears--
Col.  9, line 14, claim 7, "shaft" should be --shift--
Col.  9, line 15, claim 7, "shaft" should be --shift--
Col. 11, lines 49-51, claim 21, delete " a shift sleeve having an internally
splined surface slidably coupled to said hub and having an externally
splined surface;"
Col. 11, line 68, claim 21, after "shift" insert --sleeve--
Col. 12, line  8, claim 21, "for" should be --from--
Col. 12, line 60, claim 25, "with" should be -within--
Col. 12, line 66, claim 25, "and" should be --said--
Col. 14, line  1, claim 26, "with" should be --which--
```

Signed and Sealed this

Nineteenth Day of July, 1994

BRUCE LEHMAN

*Attest:*

*Attesting Officer*     Commissioner of Patents and Trademarks